US012015968B2

(12) United States Patent
Mandelli et al.

(10) Patent No.: US 12,015,968 B2
(45) Date of Patent: Jun. 18, 2024

(54) MANAGING NETWORK SENSING CAPABILITIES IN A WIRELESS NETWORK

(71) Applicant: NOKIA TECHNOLOGIES OY, Espoo (FI)

(72) Inventors: Silvio Mandelli, Tamm (DE); Maximilian Arnold, Murrhardt (DE); Thorsten Wild, Stuttgart (DE)

(73) Assignee: NOKIA TECHNOLOGIES OY, Espoo (FI)

(*) Notice: Subject to any disclaimer, the term of this patent is extended or adjusted under 35 U.S.C. 154(b) by 53 days.

(21) Appl. No.: 17/671,765

(22) Filed: Feb. 15, 2022

(65) Prior Publication Data
US 2022/0272506 A1    Aug. 25, 2022

(30) Foreign Application Priority Data
Feb. 22, 2021   (FI) ..................................... 20215193

(51) Int. Cl.
*H04W 4/38* (2018.01)
*H04W 4/02* (2018.01)
(Continued)

(52) U.S. Cl.
CPC ............ *H04W 4/38* (2018.02); *H04W 4/025* (2013.01); *H04W 12/03* (2021.01); *H04W 24/10* (2013.01)

(58) Field of Classification Search
CPC ....... H04W 4/38; H04W 4/025; H04W 4/023; H04W 4/70; H04W 4/21; H04W 12/03; H04W 24/10; H04W 40/24; H04W 40/22; H04W 40/026; H04W 40/18; H04W 40/20; H04W 40/10; H04W 40/12; H04W 40/34;
(Continued)

(56) References Cited

U.S. PATENT DOCUMENTS

| 2009/0175232 A1* | 7/2009 | Kolding ................ H04L 5/0094 370/329 |
| 2015/0031376 A1* | 1/2015 | Liu ........................ H04W 16/10 455/450 |

(Continued)

FOREIGN PATENT DOCUMENTS

| CN | 103546888 A | 1/2014 |
| CN | 103581939 A | 2/2014 |

OTHER PUBLICATIONS

Office Action dated Aug. 16, 2021 corresponding to Finnish Patent Application No. 20215193.

(Continued)

*Primary Examiner* — Un C Cho
*Assistant Examiner* — Rasha K Fayed
(74) *Attorney, Agent, or Firm* — SQUIRE PATTON BOGGS (US) LLP

(57) ABSTRACT

A method comprising controlling sensing operations of one or more access nodes, obtaining information from the sensing operations of the one or more access nodes, receiving, from a device, a request to be provided sensing services, wherein the sensing services are based on the obtained information, determining a sensing quality of service associated with the request, receiving, from the device, information regarding sensing capabilities of the device, and based, at least partly, on the request and the sensing capabilities of the device, determining if the requested sensing services can be provided.

20 Claims, 5 Drawing Sheets

(51) Int. Cl.
*H04W 12/03* (2021.01)
*H04W 24/10* (2009.01)

(58) Field of Classification Search
CPC ... H04W 84/047; H04W 84/06; H04W 84/18; H04W 72/12; H04W 8/18; H04W 36/16; H04W 16/18; H04L 45/122; H04L 45/46; H04L 41/0806; H04L 43/08; H04B 17/318; Y02D 30/70

See application file for complete search history.

(56) References Cited

U.S. PATENT DOCUMENTS

| | | | | |
|---|---|---|---|---|
| 2016/0173404 | A1* | 6/2016 | Pouyllau | H04L 41/5003 709/226 |
| 2017/0094716 | A1* | 3/2017 | Pogorelik | H04L 67/52 |
| 2017/0251471 | A1* | 8/2017 | Jeong | H04W 52/0216 |
| 2018/0035438 | A1* | 2/2018 | Pao | H04W 72/21 |
| 2018/0084448 | A1* | 3/2018 | Yang | H04W 16/32 |
| 2018/0255503 | A1 | 9/2018 | Karlsson et al. | |
| 2019/0028185 | A1* | 1/2019 | Tomasicchio | H04B 7/18504 |
| 2019/0140726 | A1 | 5/2019 | Cirkic et al. | |
| 2019/0215713 | A1* | 7/2019 | Breuer | H04W 4/70 |
| 2019/0364399 | A1* | 11/2019 | Furuichi | H04W 8/18 |
| 2019/0364449 | A1* | 11/2019 | Yang | H04W 72/0446 |
| 2020/0229206 | A1* | 7/2020 | Badic | H04W 16/32 |
| 2020/0329440 | A1* | 10/2020 | Alpert | H04W 48/16 |
| 2020/0351677 | A1* | 11/2020 | Irie | H04W 24/02 |
| 2020/0389218 | A1* | 12/2020 | Faxér | H04L 5/0053 |
| 2021/0310350 | A1* | 10/2021 | Dubois-Decool | E21B 47/07 |
| 2022/0039135 | A1* | 2/2022 | Manolakos | H04W 24/08 |
| 2022/0322127 | A1* | 10/2022 | Sha | H04L 43/06 |

OTHER PUBLICATIONS

Finnish Seach Report dated Aug. 16, 2021 corresponding to Finnish Patent Application No. 20215193.

Communication of Acceptance—section 29a of Patents Decree dated Jan. 24, 2022 corresponding to Finnish Patent Application No. 20215193.

Thorsten Wild et al., "Joint Design of Communication and Sensing for Beyond 5G and 6G Systems," IEEE Access, vol. 9, Feb. 15, 2021, pp. 30845-30857.

Carlos De Lima et al., "Convergent Communication, Sensing and Localization in 6G Systems: An Overview of Technologies, Opportunities and Challenges," IEEE Access, vol. 9, Jan. 21, 2021, pp. 26902-26925.

Extended European Search Report dated Jun. 24, 2022 corresponding to European Patent Application No. 22155642.6.

First Office Action issued in corresponding Chinese Patent Application No. 202210155977.5 dated Jan. 4, 2023, with English summary thereof.

* cited by examiner

MANAGING NETWORK SENSING CAPABILITIES IN A WIRELESS NETWORK

FIELD

The following exemplary embodiments relate to wireless communication and managing network sensing capabilities in addition to communication.

BACKGROUND

Wireless networks provide communication services that enable devices to connect to each other and receive and transmit data. The physical resources used for communication may also be utilized for sensing such as sensing the state and behavior or various active devices and/or objects in the environment.

Publication US20170094716 discloses a virtual sensor system. An embodiment of a mobile device includes a transmitter to transmit data and a receiver to receive data; and one or more sensors. Upon receiving a measurement request from a requestor, the measurement request including one or more measurement requirements including at least one type of sensor measurement, the mobile electronic device is to compare the one or more measurement requirements against at least sensor capabilities of the mobile electronic device. Upon determining that there is a match between the sensor capabilities and the one or more measurement requirements, the mobile electronic device is to perform a measurement with at least one of the one or more sensors to produce sensor data, and transmit a response including the sensor data to the requestor.

Publication US2020229206 discloses a central trajectory controller including a cell interface configured to establish signaling connections with one or more backhaul moving cells and to establish signaling connections with one or more outer moving cells, an input data repository configured to obtain input data related to a radio environment of the one or more outer moving cells and the one or more backhaul moving cells, and a trajectory processor configured to determine, based on the input data, first coarse trajectories for the one or more backhaul moving cells and second coarse trajectories for the one or more outer moving cells, the cell interface further configured to send the first coarse trajectories to the one or more backhaul moving cells and to send the second coarse trajectories to the one or more outer moving cells.

T. Wild, V. Braun and H. Viswanathan, "Joint Design of Communication and Sensing for Beyond 5G and 6G Systems," in IEEE Access, vol. 9, pp. 30845-30857, 2021, doi: 10.1109/ACCESS.2021.3059488 discloses a 6G vision of creating authentic digital twin representations of the physical world calls for new sensing solutions to compose multi-layered maps of our environments. Radio sensing using the mobile communication network as a sensor has the potential to become an essential component of the solution. With the evolution of cellular systems to mmWave bands in 5G and potentially sub-THz bands in 6G, small cell deployments will begin to dominate. Large bandwidth systems deployed in small cell configurations provide an unprecedented opportunity to employ the mobile network for sensing. In this paper, we focus on the major design aspects of such a cellular joint communication and sensing (JCAS) system. We present an analysis of the choice of the waveform that points towards choosing the one that is best suited for communication also for radar sensing. We discuss several techniques for efficiently integrating the sensing capability into the JCAS system, some of which are applicable with NR air-interface for evolved 5G systems. Specifically, methods for reducing sensing overhead by appropriate sensing signal design or by configuring separate numerologies for communications and sensing are presented. Sophisticated use of the sensing signals is shown to reduce the signaling overhead by a factor of 2.67 for an exemplary road traffic monitoring use case. We then present a vision for future advanced JCAS systems building upon distributed massive MIMO and discuss various other research challenges for JCAS that need to be addressed in order to pave the way towards natively integrated JCAS in 6G.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to control sensing operations of one or more access nodes, obtain information from the sensing operations of the one or more access nodes, receive, from a device, a request to be provided sensing services, wherein the sensing services are based on the obtained information, determine a sensing quality of service associated with the request, receive, from the device, information regarding sensing capabilities of the device, and based, at least partly, on the request and the sensing capabilities of the device, determine if the requested sensing services can be provided.

According to a second aspect there is provided an apparatus comprising means for controlling sensing operations of one or more access nodes, obtaining information from the sensing operations of the one or more access nodes, receiving, from a device, a request to be provided sensing services, wherein the sensing services are based on the obtained information, determining a sensing quality of service associated with the request, receiving, from the device, information regarding sensing capabilities of the device, and based, at least partly, on the request and the sensing capabilities of the device, determining if the requested sensing services can be provided.

According to a third aspect there is provided a method comprising controlling sensing operations of one or more access nodes, obtaining information from the sensing operations of the one or more access nodes, receiving, from a device, a request to be provided sensing services, wherein the sensing services are based on the obtained information, determining a sensing quality of service associated with the request, receiving, from the device, information regarding sensing capabilities of the device, and based, at least partly, on the request and the sensing capabilities of the device, determining if the requested sensing services can be provided.

According to a fourth aspect there is provided a computer program comprising instructions for causing an apparatus to perform at least the following: control sensing operations of one or more access nodes, obtain information from the sensing operations of the one or more access nodes, receive, from a device, a request to be provided sensing services, wherein the sensing services are based on the obtained information, determine a sensing quality of service associated with the request, receive, from the device, information regarding sensing capabilities of the device, and based, at least partly, on the request and the sensing capabilities of the device, determine if the requested sensing services can be provided.

According to a fifth aspect there is provided a computer program product comprising instructions for causing an apparatus to perform at least the following: control sensing operations of one or more access nodes, obtain information from the sensing operations of the one or more access nodes, receive, from a device, a request to be provided sensing services, wherein the sensing services are based on the obtained information, determine a sensing quality of service associated with the request, receive, from the device, information regarding sensing capabilities of the device, and based, at least partly, on the request and the sensing capabilities of the device, determine if the requested sensing services can be provided.

According to a sixth aspect there is provided a computer program comprising instructions stored thereon for performing at least the following: control sensing operations of one or more access nodes, obtain information from the sensing operations of the one or more access nodes, receive, from a device, a request to be provided sensing services, wherein the sensing services are based on the obtained information, determine a sensing quality of service associated with the request, receive, from the device, information regarding sensing capabilities of the device, and based, at least partly, on the request and the sensing capabilities of the device, determine if the requested sensing services can be provided.

According to a seventh aspect there is provided a non-transitory computer readable medium comprising program instructions for causing an apparatus to perform at least the following: control sensing operations of one or more access nodes, obtain information from the sensing operations of the one or more access nodes, receive, from a device, a request to be provided sensing services, wherein the sensing services are based on the obtained information, determine a sensing quality of service associated with the request, receive, from the device, information regarding sensing capabilities of the device, and based, at least partly, on the request and the sensing capabilities of the device, determine if the requested sensing services can be provided.

According to an eight aspect there is provided non-transitory computer readable medium comprising program instructions stored thereon for performing at least the following: control sensing operations of one or more access nodes, obtain information from the sensing operations of the one or more access nodes, receive, from a device, a request to be provided sensing services, wherein the sensing services are based on the obtained information, determine a sensing quality of service associated with the request, receive, from the device, information regarding sensing capabilities of the device, and based, at least partly, on the request and the sensing capabilities of the device, determine if the requested sensing services can be provided.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
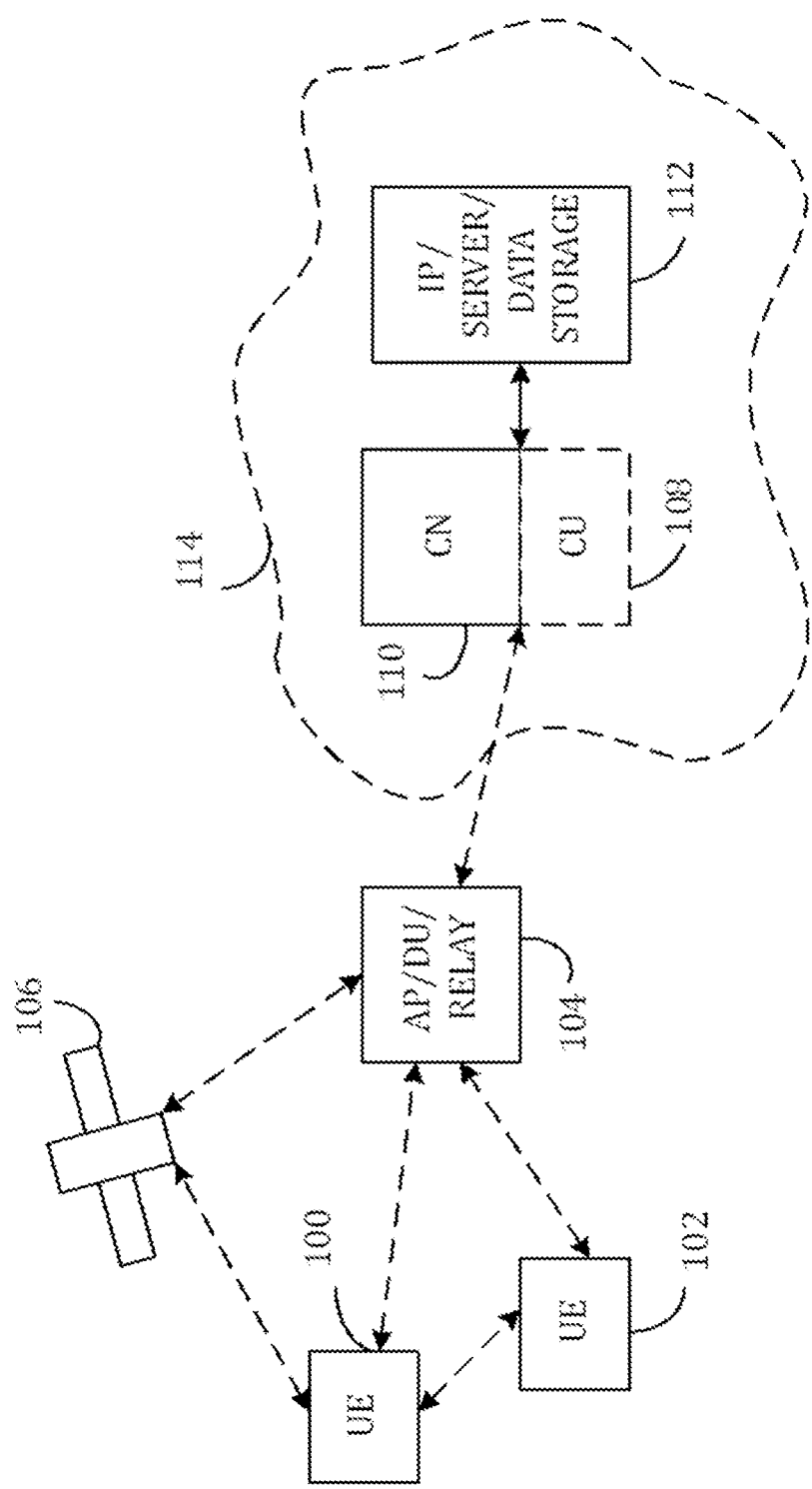

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

As used herein, the term "determining" (and grammatical variants thereof) can include, not least: calculating, computing, processing, deriving, measuring, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

FIG. 1 shows terminal devices 100 and 102 configured to be in a wireless connection on one or more communication channels in a cell with an access node (such as (e/g)NodeB) 104 providing the access network. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. A terminal device may also be a device having capability to operate in Internet of Things (IoT) network.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, such as sub 6 GHz (cmWave) as well as above 6 GHz (mmWave) spectrum, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz (cmWave) and above 6 GHz (mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Satellite communication may utilise geostationary earth orbit (GEO) satellite systems, but also low earth orbit (LEO) satellite systems, for example, mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc.

While 5G develops towards utilizing higher frequency ranges than previously utilized for cellular communication networks, 6G continues this trend by developing towards even higher frequency bands as well as wider bandwidths and/or massive antenna arrays, which allows having sensing solutions that have very fine range, Doppler and angular resolution. The coexistence of sensing and communication services envisaged for the 6G may require sharing resources in time, frequency and space and the resources may be shared in a continuous manner. The frequency bands used may be in THz frequencies, which have benefits such as being unable to penetrate objects, having larger bandwidths available and shorter wavelengths. As the frequencies do not penetrate objects, a more direct relation between the propagation paths and the propagation environment is obtained. As at higher frequencies larger absolute bandwidth is available, multi-path components may be separated more easily due to the increased resolution of time of arrival estimates. Thus, more paths may be uniquely distinguished. And as the wavelengths are shorter, antennas may also be smaller which would allow more antennas to be comprised in small devices. The more there are antennas, such as tens or hundreds of antennas, the more beneficial that may be for angle estimation. Further, as 6G may enable high-rate communication links, those may be utilized for quick and reliable sharing of map and location information between different sensing devices.

Figure 2A:
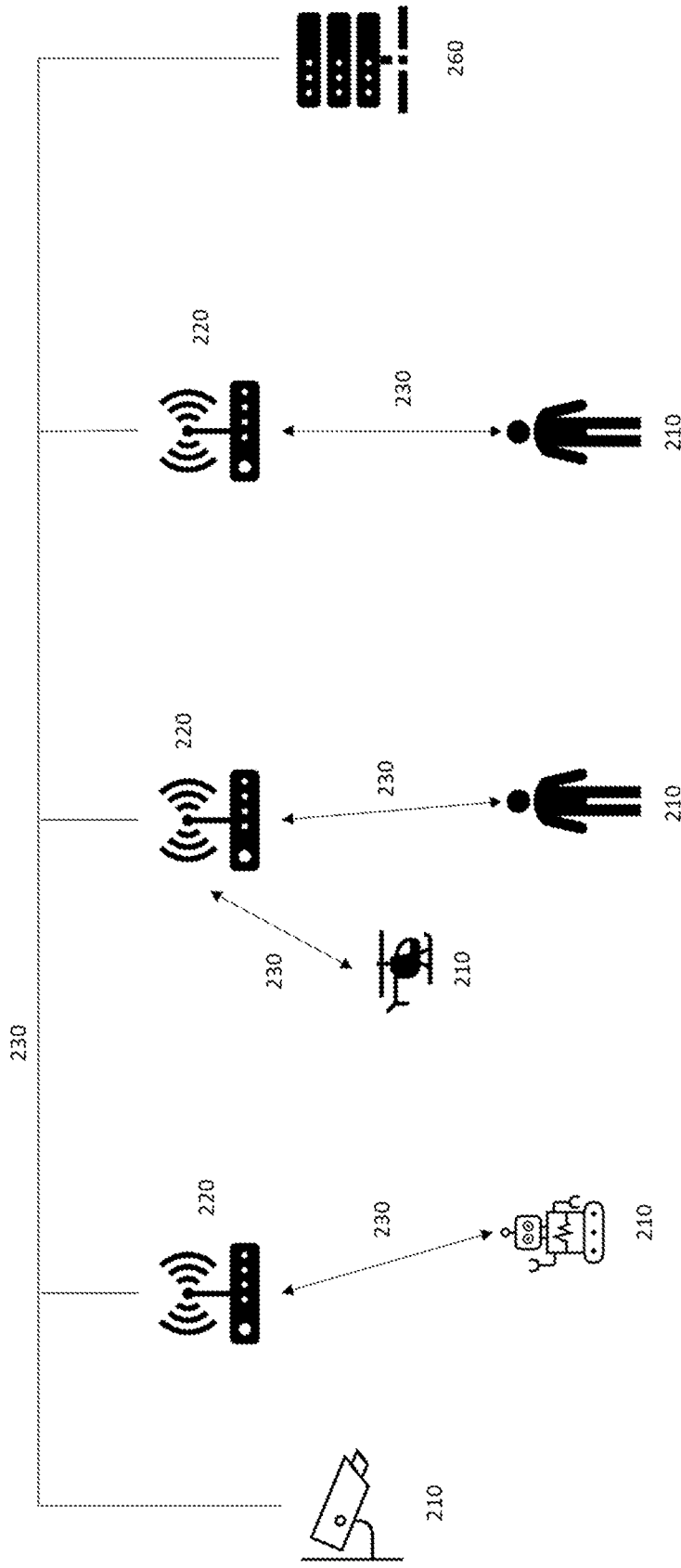
FIGS. 2A and 2B illustrate an exemplary embodiment of joint communication and sensing network.
Figure 2B:
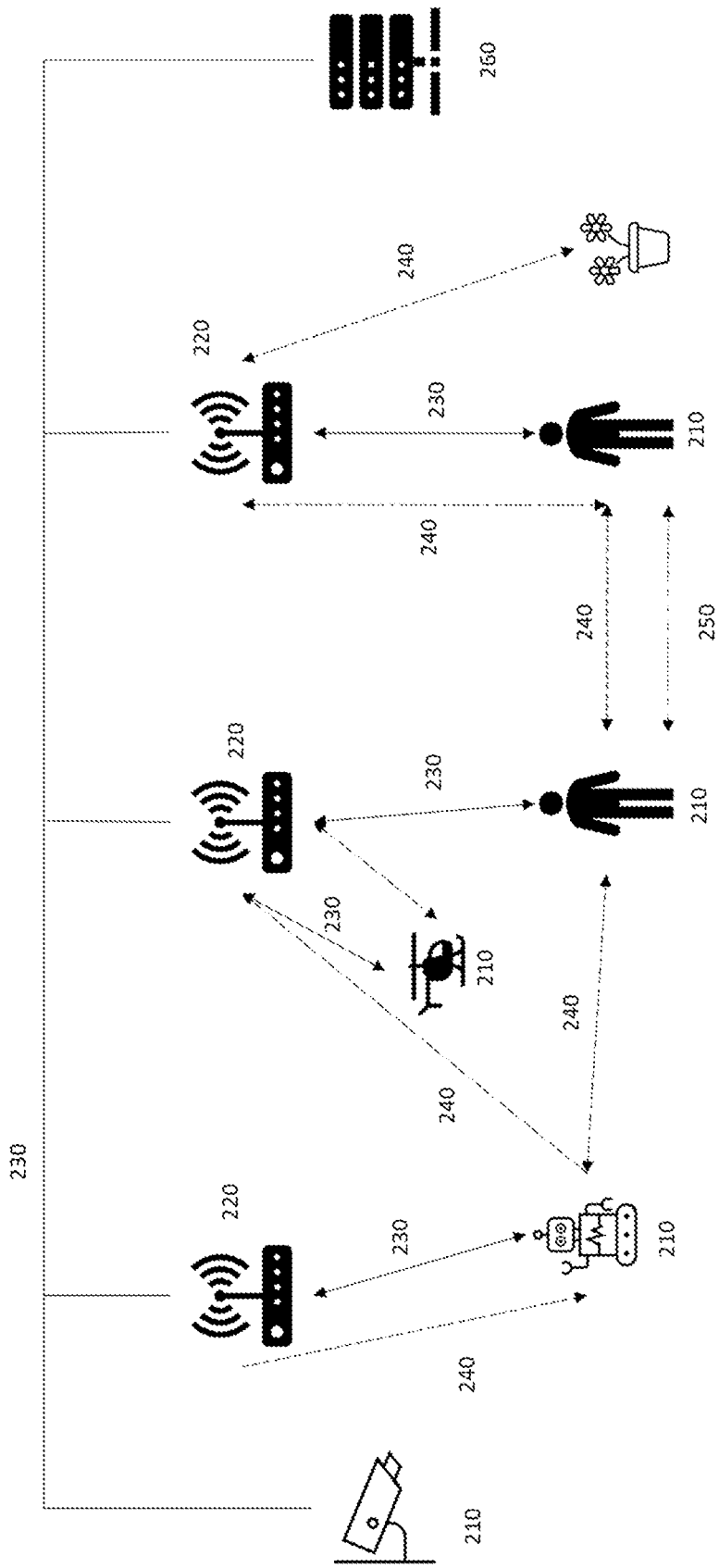

FIGS. 2A and 2B illustrate an exemplary embodiment of communication network with active devices in which a RAN enables joint communication and sensing, JCAS. In this exemplary embodiment, a node that has information to be transmitted or received is an active node with a device 210, where the devices are connected to an access node 220. It is to be noted that although an access node is discussed here, a more simple radio head in general may also be used instead of an access node as full capabilities of a base station may not be required. A device 210 may be for example surveillance camera, a robot, a mobile device or a wearable device carried by a user or a vehicle. For a device to be able to access the services provided by the one or more access nodes 220, the device is to have a subscription that defines the quality of service, QoS, and the access rights available for that device. In FIG. 2A the communication links 230 are illustrated and the QoS associated with the communication links 230 may be reliability and/or throughput. It is to be noted that although reliability and throughput are mentioned in this exemplary embodiment, wireless networks, such as 5G, may also have other key performance indicators such as delay and maximum burst size, that could also be taken into account when defining QoS. The QoS may be determined for example based on billing associated with the network subscription. For example, different business models may be used to bill the network subscription that may have different types such as home connection, mobile phone or network slice comprising many devices. Different types may have different QoS and communication allowance. Once a device access the network services provided by the one or more access nodes 220, the access node are supposed to identify the device and its subscription type, mark the device's traffic with the right QoS flags, such that the radio resource scheduler can allocate resources with the correct priority and satisfy, its required performance, and secure the physical state of the network and its devices, only allowing the network provider to know all connected devices and their states, thus, giving only some indicators for the network quality and the state of the network to the device.

Yet, if in addition to communication, also sensing is provided by the network such as a 6G network, it is to be ensured that the communication and sensing part of JCAS can exploit their symbiotic relationship. Devices that are connected to and served by a network such as a 6G network that is providing both communication and sensing may have different requirements in terms of sensing QoS, which may be defined for example as positioning resolution and/or aliasing. Thus, the sensing QoS is also to be signalled, managed and also commercialized. The sensing capabilities are therefore to co-exist with wireless communication network business models. Thus, if wireless networks are able to perform sensing applications, the radio access network (RAN) is to accommodate this type of services, handle their JCAS QoS, prioritization, monetization and also prevent and/or react to resource droughts and/or collisions.

The plurality access nodes 220 may provide sensing to a platform that provides sensing services. The platform may have a platform controller 260. The platform, which may also be considered as a server, may thus harvest information from the plurality of access nodes that are capable of sensing the environment and operations regarding the platform may be controlled by the controller 260. The controller 260 may be run in an edge cloud for example. The controller 260 resides in the platform that provides sensing services and the controller 260 comprises software algorithms that, when executed, perform functionalities that control the sensing services provided by the platform. The controller 260 and the plurality of access nodes 210 may together be comprised in, or they may form, the platform that provides sensing services. The controller 260 may also, at least partly, manage the plurality of access nodes 210 and their operations. The plurality of access nodes 210 may transmit, in DL, pilot signals at different time and frequency slots and the pilot signals may be received by a device 210. In UL, the plurality of access nodes 220 may receive pilot signals transmitted by the device 210.

The access nodes 220, and optionally also the devices 210, thus perform sensing operations. The sensing operations may be controlled by the controller 260 that resides in the platform. Controlling may also be understood as managing or supporting. Information obtained by the sensing operations is then aggregated and managed by the platform and the aggregation and managing may be controlled by the controller 260 that resides in the platform. The devices 210, and also access nodes 220, may then request access to the information obtained by the sensing operations. In other words, the devices and optionally also one or more access nodes, may be provided with sensing services. The sensing services may have a sensing quality of service also associated with them. If the information obtained by the sensing operations is then shared with a device or with an access node, the sharing may be subjected to billing. The billing may be based on for example the usage, the effort of the network and/or the obtained sensing quality of service.

FIG. 2B illustrates in addition to the communication links 230 also sensing links 240 and distance 250 that may be enabled by the JCAS. The distance 250 however may be estimation that may also be considered as sensing. In this exemplary embodiment, the sensing QoS, S-QoS, may comprise accuracy, possibilities and/or update-rate. In this exemplary embodiment, sensing service requests, which may be understood as requests to access information obtained by sensing operations, are managed in accordance with sensing quality of service, S-QoS associated with devices 210. In this exemplary embodiment, devices 210 communicate their sensing requirements to the one or more access nodes 220 that may also provide sensing as a service, SAS and the SAS may be controlled by the controller 260. Yet, it is to be noted that an access node 220 could also act as a device that needs to perform sensing operations. This may be the case for example if the access node 220 is performing passive sensing operations, transmitting and receiving at the same time. When the one or more access nodes 220 provide SAS, they may create a service platform, as described above, and the platform may be controlled by the controller 260 by harvesting information emerging from passive sensing and active sensing of the access nodes 220. The platform controller 260 may further compute information regarding the environment and the information may be transmitted to devices that are authorized to access the information and require the information. The information may comprise for example knowledge regarding which objects are present and where in the environment. A passive sensing may be understood as exploiting emissivity or natural reflection of surfaces and active sensing may be understood as transmitting a pre-determined sounding waveform and processing the echoes coherently to extract range, Doppler and angular information, which may be at high accuracy and resolution. The one or more access nodes 220 are also to handle management and the brokerage of DL and UL sensing resources in each managed cell, accepting/rejecting/downgrading the required S-QoS by each user in each managed cell according to the sensing capabilities and resources available at every cell and, based on the S-QoS, schedule the available wireless sensing resources in each managed cell. The one or more access nodes 220 forming the platform controlled by the controller 260 may also optionally communicate to the device 210 the necessary information to run sensing operations and/or expose the price of sensing services and charge flat or pay-per-use fees regarding SAS.

Dynamic allocation of resources, when wireless communication with a layered structure is used, is handled at layer 2, the so-called medium access control, MAC, layer. MAC layer allocates the right amount of resources at the right time to every active data radio bearer, DRB, or device. MAC layer may optionally also allocate frequency bands as well. When allocating resources, the MAC layer has the following goals: satisfying, as much as possible, the QoS of each active DRB in terms of throughput, reliability and latency, serving those DRBs or devices that have something to transmit and if the resources are scarce, applying the proper prioritization and fairness policies according to QoS and the desired system behavior.

If a wireless network, however, has JCAS capabilities, then the S-QoS paradigm may be applied on a per-device basis, instead of per-DRB approach. The S-QoS may be determined by a device according to the most stringent requirement by its active applications and/or services. It is to be noted that also an access node may act as a sensing device, requiring access to sensing operations using for example DL/UL resources. Sensing performance is affected by the resources used to measure a channel with regard to range, angle and position. Resolution of the performance may be understood as the capability of discriminating two close peaks and domain aperture may be understood as the capability of recognizing peaks in a big-enough interval. If the domain aperture is not large enough, peaks may be detected at wrong places. For example, if the domain aperture of speed is 200 m/s, speeds in certain range, such as from −100 m/s to +100 m/s, may be detected without aliasing. Values outside [−100,100] m/s may be wrapped inside that interval by adding integer multiples of 200 m/s (200 m/s will become 0 m/s). Further, the update rate of a sensing measure may be considered as important for the sensing application performance and the required resource occupation to perform sensing operations. The same may be true for the desired robustness to interference, as interference may impact the confidence of the measure regarding sensing in a more severe way than interference affects confidence on data transmissions, which may be corrected using re-transmissions. Therefore, the S-QoS may determine, in addition to how many resources are needed to perform sensing, also the shape of their allocation in the time, frequency and spatial domain and also, optionally, coordination among different cells.

In some exemplary embodiments signalling that communicates the required S-QoS for a device such as a terminal device may be performed in a manner explained below. Signalling may be such that it communicates the required S-QoS directly. The signalling may indicate flags regarding if uplink and/or downlink operations are enabled for the device. There may thus be two flags used to indicate this, one for uplink and one for downlink operations. The signalling may also indicate a desired update rate. The signalling may also indicate for UL and DL sensing operations the following:

Desired periodicity or update rate of the sensing measure.

A total bandwidth.

Frequency periodicity, i.e. how often a pilot signal is to be spaced in the frequency domain. This determines ranging aliasing.

A device sensing priority. As in DL devices are not competing for resources but are able to measure the same pilots signals transmitted by a base station, this may be less important than in UL.

Optionally, the signalling may comprise for UL sensing a number of desired allocations within a periodicity to allow beam sweeping to occur at a transmit side of the device. It is to be noted that for DL sensing, the base station may provision the right beam sweeping procedure.

The signalling may, in some exemplary embodiments, be indirect signalling that communicates the required S-QoS for a device such as a terminal device, The signalling may indicate flags regarding if uplink and/or downlink operations are enabled for the device. There may thus be two flags used to indicate this, one for uplink and one for downlink operations. The signalling may also indicate a desired update rate. The signalling may also indicate sensing priority for the device. The signalling may also indicate the desired overall resolution and aliasing of position, and/or speed, and/or orientation. As the signalling in this exemplary embodiment is indirect, the access node, that is comprised in the group of access nodes providing the SAS that is controlled by a controller such as the controller 260, will then, based on the signalling, determine the right direct sensing configuration to allow the required sensing performances. In other words, the device determines and signals the indirect requirements whereas in the direct signalling the device determines and signals the direct requirements for the SAS. The determining may also comprise the access node obtaining at least part of the configuration from the controller.

In the exemplary embodiments described above, before the signalling there may be signalling regarding the capabilities of the device with respect to sensing. This may be to allow the base station to determine how and if a S-QoS requested can be satisfied. This signalling may be carried as an extension of RRC UE Radio Capabilities signaling according to 3GPP TS 23.501, TS 38.306, for example. The extension may comprise additional information exchanged such as DLSensingCapabilities ToA-MeasuringCapabilities (yes/no and, optionally, maximum bandwidth and confidence achievable with it)

AoA-MeasuringCapabilities (yes/no and optionally, information about angular confidence, like antenna aperture)

ULSensingCapabilities

MaximumBandwidthForULSensing: the maximum aperture in frequency domain achievable to transmit UL signals for sensing. This may be the maximum bandwidth usable for communications, or alternatively, higher bandwidths may be used by some devices to send pilot signals needed for sensing.

When the access node that is comprised in the group of access nodes providing SAS receives, from a device, the required S-QoS regarding DL and UL, the sensing capabilities of the device and the current load in the system, the access node that is comprised in the platform providing the SAS determines if the requested S-QoS can be satisfied. It is to be noted that the determining may also comprise the access node obtaining, at least some, information regarding if the requested S-QoS can be satisfied from the controller comprised in the SAS platform. If the requested S-QoS cannot be satisfied, at least one of the access nodes comprised in the platform providing the SAS may take one of the following actions: reject the S-QoS request, degrade the S-QoS of the device, and signal it back to the device, to which the device may provide a message indicating an acceptance of the degradation, or remove other, already accepted, devices, that may have a lower priority, to free resources for the device. In general, the bases station providing SAS may broker DL and UL sensing resources among the active sensing devices, according to their priority and sensing requirements. If it is determined that the device can be served, sensing measurements will be organized according to the required S-QoS and performed.

Communication services may be charged for their usage and in a similar manner, also sensing services provided by the one or more access nodes may be subjected to charges. For example, a device may be associated with a network subscriptions, or eSIM, that comprise a sensing plan, which may be static such that it is agreed at subscription time, or it may be dynamically determined by brokering algorithms for example. The sensing plan may comprise one or more of the following information: sensing services required, S-QoS of the device per service, which may comprise priority, maximum usage time per month, and/or a limit on a measure representing the amount of resources used for sensing and the time that these resources are used. Optionally, in some exemplary embodiments, a fall-back sensing plan and/or S-QoS, once the allowance, such as maximum usage per month, is exceeded. May also be included in the sensing plan.

In the static plan, the device may be charged based on the sensing plan alone or on the combined sensing and communication plan. The charging may be done periodically, such as weekly or monthly. The controller, such as the controller 260, may determine that the business-related allowances are consumed once the device exploits the sensing capabilities of the network. Optionally, a fall-back sensing plan profile may be applied in case that the sensing allowance with the high quality main S-QoS and/or sensing plan has been expired.

In some exemplary embodiments, a demand and supply type of an approach could also be used. In such an approach, the access node, alone or together with the controller, may first estimate the amount of resources available for sensing operations and then translate S-QoS of different devices in terms of user priority and sensing performance in an increasing reward function. This would allow a bidding type of access to resources. The translation in this exemplary embodiment depends on the value corresponding to enabling the sensing services and the expected sensing performance, given the resources allocated for sensing and the capabilities of the one or more access nodes providing the sensing services, deployment and a rough estimate of the device position. Therefore, the achievable S-QoS and its performance depends on the position of the device and the position of the one or more access nodes comprised in the platform providing the sensing services and other context information, like the current system load.

In some other exemplary embodiments, sensing in DL allows an access node to perform operations for multiple devices at the same time. In such exemplary embodiments, devices may have the capabilities to perform DL sensing operations and thus DL is a good candidate to run active sensing operations, like device localization, where the access node transmits pilot signals and the devices receive the pilot signals and perform measurements on them. Yet, different device may have different S-QoS requirements. Accordingly, the devices may be charged for those services in a selective way, depending on the S-QoS required and obtained. Thus, in such exemplary embodiments, the access node receives S-QoS information from each active device that needs sensing services and determines the necessary resources and periodicity to serve all of them. This may be in accordance with the most stringent requirements in terms of periodicity and localization performance and may be done by scheduling enough resources for sensing pilot transmissions in order to satisfy the most stringent S-QoS requirement, i.e. selecting the highest aperture in frequency domain, selecting the lowest distance between two consecutive frequency samples and selecting the shortest periodicity. Optionally, the maximum burst size in time, which may be necessary for speed estimates with radar-like techniques, may also be selected and also optionally, the narrowest beam, in case beamforming at transmitter is to be applied, and the proper beamforming pattern taking into account blanking schemes and limitations by other cells may be selected. Then transmission of the DL pilot signals to be transmitted by the access node may be prepared. These pilot signals may be scrambled and encoded and/or encrypted in a way that a device is to know additional information to know where they are located and/or to decode them, i.e. know what the transmitted symbols were. These DL pilots may be recurrent and semi persistent scheduling techniques may be used to book resources for a longer period. Alternatively, DL pilot signals may be configured, after modifying their current specifications to allow encryption and scrambling. A DL pilot may, in some exemplary embodiments, be a positioning reference signal. Each device then receives the necessary information to detect and decode the pilots needed to achieve its desired S-QoS. The base station then performs the sensing DL pilot signal transmission, that can be received by all device. However, each of them has the necessary information to detect and decode the pilots they are allowed to detect. Optionally, devices may be differently charged based on the S-QoS that they obtain.

This procedure described above allows to properly provision DL sensing resources and allow differentiation among the S-QoS obtained among different devices, still using a unique sensing resource pool for every device performing DL sensing operations. Moreover, different business models could be instantiated for different devices, e.g. not allowing low-level subscriptions to get access to advanced sensing capabilities. To create a solution for the distribution, the pilot signals transmitted by one or more access nodes in the DL may be used to allow devices to perform sensing operations and may therefore be encrypted. The keys to decode may be distributed, by the one or more access nodes, to devices depending on the total frequency aperture, subcarrier spacing and/or time periodicity that devices can measure. The time-frequency map of the pilots used for DL sensing may also be masked and communicated to devices according to their allowance.

In an exemplary embodiment, the modulation of the encrypted sensing symbols is to use a M Phase Shift Keying, PSK, modulation with input bits resulting in a high M, making the correct phase detection difficult for devices that do not know the pilot signal. Alternatively, the amplitude of the signal may be modulated. If a new device, which may also be an access node, is to be served by a platform providing SAS and being controlled by a controller such as the controller 260, the new device shares its desired S-QoS and, after being accepted, receives the necessary information to detect and decode the next round of sensing pilot signals from one or more access nodes. If a device exits the system willingly, just the most stringent S-QoS must be updated, However, if a device must be removed from the system, that is by the platform providing SAS, the managing entity, such as the controller, can change the scrambling and encoding of the DL pilots, communicate the new information to other active devices, and then switch to the new configuration. In this way, the removed device has no means of properly detecting and decoding the new DL pilots. The pilot signals transmitted by a plurality of access nodes that provide sensing to the platform may be transmitted in different time and/or frequency resources. Yet, the plurality of access nodes will listen to the same pilot signals transmitted by each device in UL.

Figure 3:
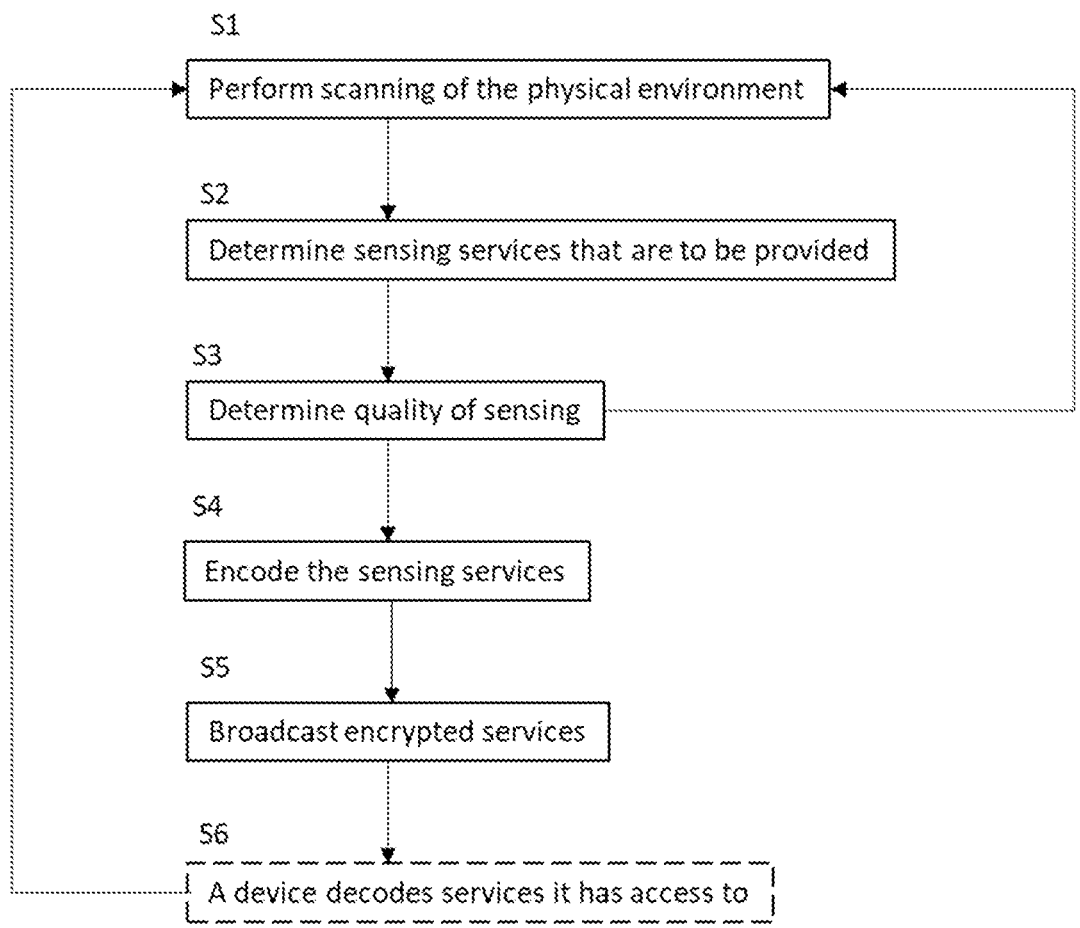
FIG. 3 illustrates a flow chart according to an exemplary embodiment of sensing as a service.

As sensing capabilities may be considered as additional information that is created by a signalling overhead and computational effort, it may be scheduled and charged to devices that have requested it. FIG. 3 illustrates a flow chart according to an exemplary embodiment of such a S-QoS and SAS procedure. First, an access node receives S-QoS information from multiple devices that require sensing services. The access node then groups the devices within the same spatial region and determines the necessary sensing resources, angles and periodicity for fulfilling the S-QoS requirements indicated by the devices. This may be done according to the most stringent parameters in i.e., selecting the highest aperture in frequency domain, selecting the lowest distance between two consecutive frequency samples, and/or selecting the shortest periodicity. Optionally, also the maximum burst size in time may be selected. Then in S1 the access node uses physical resources to scan its physical environment. For example, the access node uses the determined amount of reference signal and transmits it in the required directions for gathering the physical state of the environment. The reflected signals are measured for evaluations and calculations of the sensing services. Then in S2 the access node that is comprised in a group of access nodes providing SAS provides its measurements to the controller such as the controller 260 that gathers the measurements from the group of access nodes and performs, together with the group of access nodes sensing operations according to the required services. In other words, the controller may determine different services. Next, in S3 the access node estimates the quality of the sensing, S-QoS. This may be performed also by obtaining the estimation from the controller. To verify if more reference signals are needed, the S-QoS of each sensing service may checked; if the quality is not achieved, the access node, alone or together with the controller, provisions new sensing operations/measurements to increase the QoS by going back to S1, until the S-QoS is fulfilled. In S4 the access node then encodes SAS with partial keys. As the different services and the accuracy are encrypted with partial key, that allows devices which are allowed and payed for it to decode it. Then in S5 the access node broadcasts the encrypted services. Thus, the information is broadcasted to connected devices. In S6 devices that are allowed to access the encrypted service are able to decode it. A device may be allowed for example if the device has accepted to be charged for the service. The access node may then store available sensing information and repeat the procedure from S1 after a period of time.

The exemplary embodiments described above may exploit a broadcast channel. This may be beneficial if the network is to provide precise information about the sensed environment to devices, that may lead to considerable demand in terms of data rate. Broadcast channels help to solve this issue by avoiding the need of replication of similar information that must be decoded by two different terminals. Thanks to the scrambling and encoding, each terminal will pick up only the information that is related to it, avoiding privacy issues and the need to decode full information.

It is to be noted that in addition to 6G, the exemplary embodiments described above are applicable to other wireless radio standards, such as Wi-Fi, as well. The exemplary embodiments described above allow handling of JCAS techniques running with physical layer signal thereby allowing a transition from a RAN to a sensing access network, SAN, with JCAS capabilities. 6G for example is envisaged to define the surge of SAN with JCAS capabilities.

Figure 4:
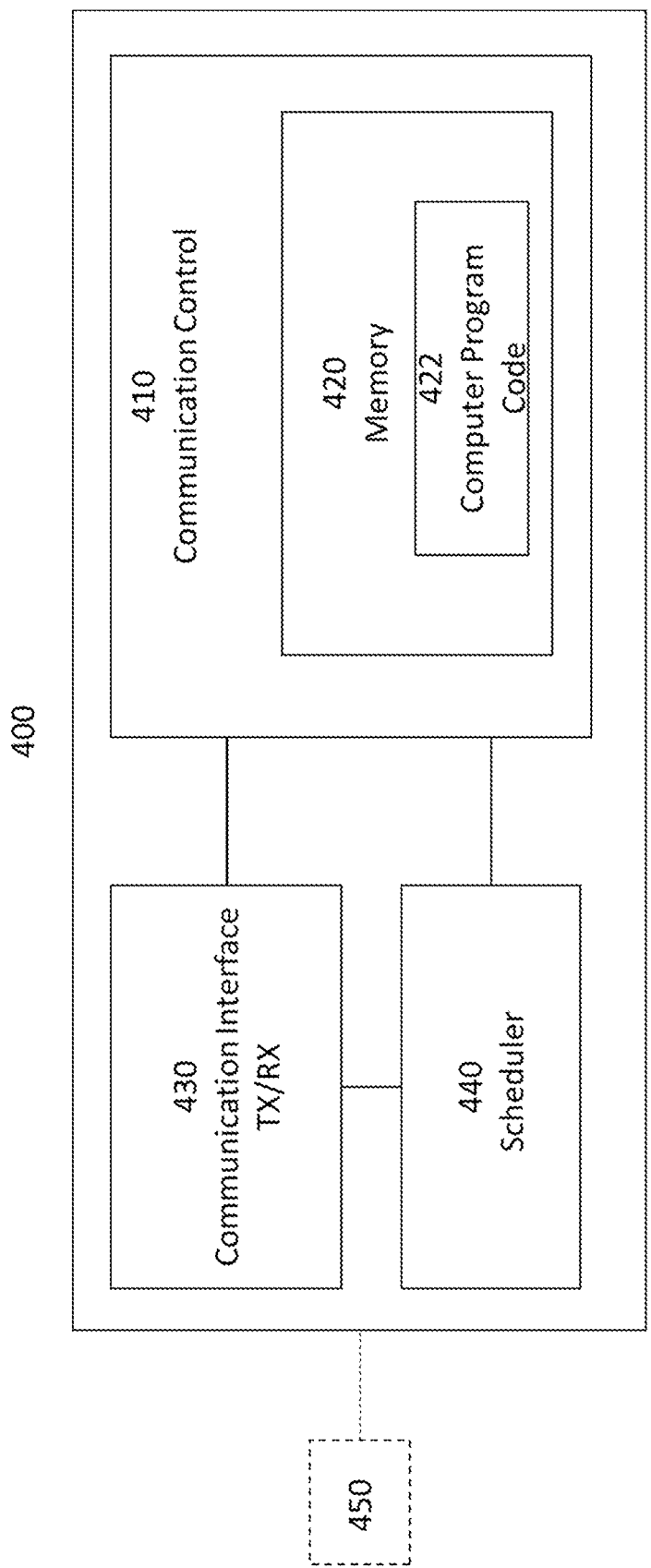
FIG. 4 illustrates an exemplary embodiment of an apparatus.

The apparatus 400 of FIG. 4 illustrates an example embodiment of an apparatus that may be an access node or be comprised in an access node or in an edge cloud that may be part of a platform 450 providing sensing services. The apparatus may be, for example, a circuitry or a chipset applicable to an access node to realize the described embodiments. The apparatus 400 may be an electronic device comprising one or more electronic circuitries. The apparatus 400 may comprise a communication control circuitry 410 such as at least one processor, and at least one memory 420 including a computer program code (software) 422 wherein the at least one memory and the computer program code (software) 422 are configured, with the at least one processor, to cause the apparatus 400 to carry out any one of the example embodiments of the access node described above.

The memory 420 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 400 may further comprise a communication interface 430 comprising hardware and/or software for realizing communication connectivity according to one or more communication protocols. The communication interface 430 may provide the apparatus with radio communication capabilities to communicate in the cellular communication system. The communication interface may, for example, provide a radio interface to terminal devices. The apparatus 400 may further comprise another interface towards a core network such as the network coordinator apparatus and/or to the access nodes of the cellular communication system. The apparatus 400 may further comprise a scheduler 440 that is configured to allocate resources.

The processor 410 interprets computer program instructions and processes data. The processor 410 may comprise one or more programmable processors. The processor 410 may comprise programmable hardware with embedded firmware and may, alternatively or additionally, comprise one or more application specific integrated circuits, ASICs.

The processor 410 is coupled to a memory 420. The processor is configured to read and write data to and from the memory 420. The memory 420 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 420 stores computer readable instructions that are execute by the processor 410. For example, non-volatile memory stores the computer readable instructions and the processor 410 executes the instructions using volatile memory for temporary storage of data and/or instructions.

The computer readable instructions may have been pre-stored to the memory 420 or, alternatively or additionally, they may be received, by the apparatus, via electromagnetic carrier signal and/or may be copied from a physical entity such as computer program product. Execution of the computer readable instructions causes the apparatus 400 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

It is to be noted that the apparatus 400 may further comprise various component not illustrated in the FIG. 4. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor; and
   at least one memory including a computer program code, wherein the at least one memory and the computer program code are configured, with the at least one processor, to cause the apparatus to:
   control sensing operations of one or more access nodes;
   obtain information from the sensing operations of the one or more access nodes;
   receive, from a device, a request to be provided sensing services, wherein the sensing services are based on the obtained information;
   determine a sensing quality of service associated with the request;
   receive, from the device, information regarding sensing capabilities of the device; and
   based, at least partly, on the request and the sensing capabilities of the device, determine if the requested sensing services can be provided;
   wherein the request comprises indication of flags for uplink and downlink operations being enabled in the device and a desired update rate for the sensing services.

2. The apparatus according to claim 1, wherein the apparatus is further caused to determine physical resources required in the one or more access nodes to satisfy the request and determine if the requested sensing services can be provided also based on availability of the physical resources required in the one or more access nodes.

3. The apparatus according to claim 1, wherein if it is determined that the requested sensing services cannot be provided, at least one of the following is performed:
the request is rejected; or
the sensing quality of service is degraded; or
another device is removed from being provided sensing services; or communication services are degraded for the device or for the other device; or
communication services are removed for the device or for the other device.

4. The apparatus according to claim 1, wherein the request further comprises desired periodicity, aperture in frequency domain, distance between two consecutive frequency samples, device sensing priority for the sensing services.

5. The apparatus according to claim 1, wherein the request further comprises device sensing priority and desired resolution and aliasing of position, speed and/or orientation for the sensing service.

6. The apparatus according to claim 1, wherein determining if the requested sensing services can be provided is further based on determining a sensing plan associated with the device.

7. The apparatus according to claim 1, wherein the apparatus is further caused to:
use physical resources of at least one access node of the one or more access nodes to perform a scanning of the physical environment;
determine the sensing services to be provided;
determine quality of sensing;
encrypt the sensing services; and
broadcast encrypted services.

8. The apparatus according to claim 7, wherein the apparatus is further caused to group the device with other devices within the same spatial region and determine resources required for the requested sensing quality of service.

9. The apparatus according to claim 1, wherein if the requested sensing services can be provided the requested sensing services accumulate billing for the device.

10. The apparatus according to claim 9, wherein the billing depends on one or more of the following:
an amount of resources required;
an overall resource availability in the one or more access nodes;
a sensing quality of service experienced by the device.

11. The apparatus according to claim 1, wherein the apparatus is further caused to determine if the sensing services can be provided based on sensing quality of service required by other devices being served with sensing services and/or current communication traffic and the quality of service associated with the current communication traffic.

12. The apparatus according to claim 1, wherein the apparatus is further caused to control sensing operations of at least one other device and to obtain information from the sensing operations of the at least one other device, and receiving, from at least one of the devices or one of the access nodes, a request for accessing the information, wherein the request further comprises a sensing quality of service on the information, and wherein the information is transmitted using encryption that can be decrypted by the at least one of the devices or one of the access nodes.

13. The apparatus according to claim 1, wherein the apparatus is a controller comprised in a sensing platform.

14. A method comprising:
controlling sensing operations of one or more access nodes;
obtaining information from the sensing operations of the one or more access nodes;
receiving, from a device, a request to be provided sensing services, wherein the sensing services are based on the obtained information;
determining a sensing quality of service associated with the request;
receiving, from the device, information regarding sensing capabilities of the device; and
based, at least partly, on the request and the sensing capabilities of the device, determining if the requested sensing services can be provided;
wherein the request comprises indication of flags for uplink and downlink operations being enabled in the device and a desired update rate for the sensing services.

15. The method according to claim 14, the method further comprising determining physical resources required in the one or more access nodes to satisfy the request and determining if the requested sensing services can be provided also based on availability of the physical resources required in the one or more access nodes.

16. The method according to claim 14, wherein if it is determined that the requested sensing services cannot be provided, at least one of the following is performed:
the request is rejected; or
the sensing quality of service is degraded; or
another device is removed from being provided sensing services; or communication services are degraded for the device or for the other device; or
communication services are removed for the device or for the other device.

17. The method according to claim 14, wherein the request further comprises desired periodicity, aperture in frequency domain, distance between two consecutive frequency samples, device sensing priority for the sensing services.

18. The method according to claim 14, wherein the request further comprises device sensing priority and desired resolution and aliasing of position, speed and/or orientation for the sensing service.

19. The method according to claim 14, wherein determining if the requested sensing services can be provided is further based on determining a sensing plan associated with the device.

20. A computer program embodied on a non-transitory computer-readable medium, said computer program comprising instructions which, when executed on an apparatus, cause the apparatus to:
control sensing operations of one or more access nodes;
obtain information from the sensing operations of the one or more access nodes;
receive, from a device, a request to be provided sensing services, wherein the sensing services are based on the obtained information;
determine a sensing quality of service associated with the request;
receive, from the device, information regarding sensing capabilities of the device; and
based, at least partly, on the request and the sensing capabilities of the device, determine if the requested sensing services can be provided;
wherein the request comprises indication of flags for uplink and downlink operations being enabled in the device and a desired update rate for the sensing services.

* * * * *